US012625952B2

(12) United States Patent
Grigorian et al.

(10) Patent No.: US 12,625,952 B2
(45) Date of Patent: May 12, 2026

(54) SECURE MIL-STD-1553 DATA BUS

(71) Applicant: ABACO SYSTEMS, INC., Huntsville, AL (US)

(72) Inventors: Sam Grigorian, Fresno, CA (US); Tim Uhl, Goleta, CA (US)

(73) Assignee: ABACO SYSTEMS, INC., Huntsville, AL (US)

( * ) Notice: Subject to any disclaimer, the term of this patent is extended or adjusted under 35 U.S.C. 154(b) by 117 days.

(21) Appl. No.: 18/555,899

(22) PCT Filed: Apr. 30, 2021

(86) PCT No.: PCT/US2021/030121
§ 371 (c)(1),
(2) Date: Oct. 18, 2023

(87) PCT Pub. No.: WO2022/231617
PCT Pub. Date: Nov. 3, 2022

(65) Prior Publication Data
US 2024/0202330 A1      Jun. 20, 2024

(51) Int. Cl.
*G06F 21/55*        (2013.01)
*G06F 13/42*        (2006.01)

(52) U.S. Cl.
CPC ........ *G06F 21/554* (2013.01); *G06F 13/4282* (2013.01); *G06F 2221/034* (2013.01)

(58) Field of Classification Search
CPC .............. G06F 21/554; G06F 13/4282; G06F 2221/034
See application file for complete search history.

(56) References Cited

U.S. PATENT DOCUMENTS

| | | | |
|---|---|---|---|
| 2011/0154501 A1* | 6/2011 | Banginwar | H04L 9/3236 726/26 |
| 2020/0389469 A1* | 12/2020 | Litichever | H04W 12/12 |
| 2020/0410399 A1* | 12/2020 | Lang | G06N 5/01 |
| 2021/0334370 A1* | 10/2021 | Vessels | G06F 21/566 |
| 2023/0045488 A1* | 2/2023 | Rajguru | A61B 8/0891 |

FOREIGN PATENT DOCUMENTS

| | | | | |
|---|---|---|---|---|
| WO | WO-2021061715 A1 * | 4/2021 | | G06F 21/554 |

OTHER PUBLICATIONS

PCT/US2021/030121, International Search Report and Written Opinion, Aug. 5, 2021, 9 pages.
Extended European Search Report in connection to EP Application No. 21939556, dated Jan. 7, 2025.

* cited by examiner

Primary Examiner — Anh Nguyen
(74) Attorney, Agent, or Firm — Meunier Carlin & Curfman LLC

(57) ABSTRACT
Systems, devices, and methods for providing security on a MIL-STD-1553 serial data bus are described herein. Detected anomalies on the serial data bus that are determined to be threats are invalidated.

19 Claims, 14 Drawing Sheets

SECURE MIL-STD-1553 DATA BUS

BACKGROUND

MIL-STD-1553 is a military standard published by the United States Department of Defense that defines the mechanical, electrical, and functional characteristics of a serial data bus. It was originally designed for use with military avionics but has also become commonly used in spacecraft on-board data handling (OBDH) subsystems, both military and civil. It features a dual redundant balanced line physical layer, a (differential) network interface, time division multiplexing, half-duplex command/response protocol, and up to 31 remote terminals (devices).

Since its inception in 1973 and in subsequent revisions during the ensuing years, MIL-STD-1553 has evolved into the predominant, internationally accepted networking standard for the integration of military platforms. Today, the standard has expanded beyond its traditional domain of US Air Force and Navy aircraft to encompass applications for combat vehicles, ships, satellites, missiles, and the International Space Station Program, as well as advanced commercial avionic applications. Once considered primarily a military data bus standard, MIL-STD-1553 has caught the attention of commercial aircraft manufacturers who seek to capitalize upon the standard's inherent reliability, robustness, maturity, and superior EMI performance.

The current version of MIL-STD-1553 is MIL-STD-1553B, "Aircraft Internal Time Division Command/Response Multiplex Data Bus," originally published on Sep. 21, 1978, by the U.S. Department of Defense, which is fully incorporated by reference, though as used herein the term "MIL-STD-1553" means either MIL-STD-1553A, MIL-STD-1553, or any future release/upgrade of the standard.

MIL-STD-1553 has a long history going back to the 1970s, and it remains very active today even in new systems. MIL-STD-1553 is deterministic and dual-redundant, thus making it highly fault tolerant and suitable for use in mission-critical systems. MIL-STD-1553 will likely be a part of military platforms for many years to come.

However, MIL-STD-1553 was developed before cyber security became a concern. MIL-STD-1553 has no inherent security features built into the protocol itself, and thus has significant vulnerabilities. In complex modern systems, with many MIL-STD-1553 terminals being part of intelligent and interconnected subsystems, security has become a growing concern.

Potential threats on MIL-STD-1553 data buses include, for example, the following basic threats and how they would appear relative to the 1553 bus: (1) compromised bus controller (BC) software; for example, the BC is re-programmed to send malicious commands or sequence of commands and/or data; (2) compromised remote terminal (RT) software; for example, the RT is re-programmed as a malicious BC; (3) compromised RT software; for example, the RT is re-programmed to transmit incorrect/corrupted data; (4) a second (false) BC sending malicious commands or sequence of commands and/or data; (5) a terminal (generally configured as a BC) can create traffic to cause collisions, resulting in a denial-of-service type of attack; (6) a malicious BC connected to maintenance port; (7) and the like. These are only examples. There is almost no limit to the types of theoretical attacks which one could imagine, but many are impractical or inapplicable to the vast majority of systems. For example, some have suggested that attacks could take the form of a slight altering of the timing of either BC messages and/or RT response time to slowly and indirectly "leak" sensitive or classified data. This type of attack would require at least two terminals to be compromised and participating in the attack, as well as the ability to both control and detect the subtle timing differences.

Previously proposed MIL-STD-1553 security concepts include blocking/filtering of command words and possibly also data words. In some instances, security may be required to be incorporated into individual terminals. Also in some instances, security may be specific to the configuration of the network.

Therefore, what is needed are systems and methods for providing security for data buses utilizing MIL-STD-1553 that overcome challenges in the art, some of which are described above. In particular, an approach that provides simple, reliable, easy-to-integrate security for MIL-STD-1553 communication buses is desired that focus on the message content itself and preventing unauthorized messages from completing successfully.

SUMMARY

Disclosed and described herein are embodiments of a bus security device that provides security on a MIL-STD-1553 serial data bus. In one aspect the device comprises a memory, wherein the memory at least contains security rules stored thereon; a processing circuit in communication with the memory; and a transceiver that connects the bus security device to the MIL-STD-1553 serial data bus. The processing circuit is programmed to monitor the MIL-STD-1553 serial data bus in accordance with the security rules stored in the memory; and if the processing circuit detects an anomaly on the serial data bus that is characterized as a threat by the rules stored in the memory, then the processing circuit causes the transceiver to inject an invalidation signal onto the data bus to counteract the anomaly.

In some instances, the memory of the device comprises non-volatile memory. For example, the memory may comprise flash memory.

In some instances, the security rules are stored on the memory using hardware description language (HDL) or a lookup table.

In various instances, the memory may be integrated into the processing circuit, or it may be separate from the processing circuit.

In various instances, the processing circuit of the device may comprise a field-programmable gate array (FPGA), a processor or microprocessor, an application-specific IC (ASIC), and the like.

In various instances, the transceiver of the device connects the security device to the MIL-STD-1553 serial data bus by a transformer or directly.

In various instances, the anomaly comprises a message on the MIL-STD-1553 serial data bus that is characterized as a threat. For example, the message on the MIL-STD-1553 serial data bus may be characterized as a threat based on content of the message.

In various instances of the device, the invalidation signal comprises a relatively short transmission burst injected onto the data bus that creates a collision with either a data or status word transmission and causes the message identified as a threat to be invalidated. Generally, the invalidation signal is at a higher frequency than normal traffic on the MIL-STD-1553 serial data bus. For example, the invalidation signal may be at or above the maximum level specified in MIL-STD-1553 to ensure the message is invalidated by corrupting Manchester encoding or sync encoding of the message.

In some instances, the device may further comprise an indicator that provides an indication that an anomaly has been detected. For example, the indication may be in the form of an electronic signal, and/or audible or visible indicators, and the like.

In various instances, the device may be a stand-alone device connected to the MIL-STD-1553 serial data bus, while in other instances the device may be integrated into a bus controller (BC). For example, the device may be integrated into an unsecure BC, or it may be integrated into a secure BC.

In various instances, the device may provide security against false BC attacks caused by a second false BC generating traffic on the serial data bus. In some instances, the device further comprises a transmit detect device to detect a transmission in a stub of the serial data bus that connects the BC to the serial data bus.

In some instances, the device detects a transmission by the BC. For example, the device may detect BC command transmission by both monitoring the serial data bus and by detecting current in the stub of the serial data bus. Any detected transmission determined to not be initiated by the BC is invalidated by the device.

In some instances, the BC into which the device is integrated may comprise a fixed silicon BC protocol sequencer and/or a BC that cannot be modified. For example, the BC may be a secure BC. In such instances, the device detects a command word transmission in the serial data bus or in a stub of the serial data bus that connects the BC to the serial data bus and determines whether the command word transmission was initiated by the BC or not by the BC. For example, the device may determine whether the command was initiated by the BC either by direct integration with a BC sequencer in the processing circuit, or by detection of a command word transmission by detecting current in the stub of the serial data bus. If the device determines the command word transmission was not initiated by the BC, then it determines that the command word transmission was initiated by a false BC, and the device invalidates the command word transmission initiated by the false BC.

Also disclosed and described herein are methods of providing security on a MIL-STD-1553 serial data bus. In one aspect, the method comprises monitoring the MIL-STD-1553 serial data bus in accordance with security rules; and in response to detecting an anomaly on the serial data bus that is characterized as a threat by the security rules, then the injecting an invalidation signal onto the data bus to counteract the anomaly. For example, the message on the MIL-STD-1553 serial data bus may be characterized as a threat based on content of the message.

In some instances of the method, the invalidation signal comprises a relatively short transmission burst injected onto the data bus that creates a collision with either a data or status word transmission and causes the message identified as a threat to be invalidated. The invalidation signal may be at a higher frequency than normal traffic on the MIL-STD-1553 serial data bus. For example, the invalidation signal may be at or above the maximum level specified in MIL-STD-1553 to ensure the message is invalidated by corrupting Manchester encoding or sync encoding of the message.

In some instances, the method further comprises providing an indicator that provides an indication that the anomaly has been detected. For example, the indication may be in the form of an electronic signal, and/or audible or visible indicators, and the like.

In various instances, the method may be performed by a device that is a stand-alone device connected to the MIL-STD-1553 serial data bus. In some instances, the method may be performed by a device that is integrated into a bus controller (BC). The BC may be a secure BC or an unsecure BC.

In instances where the BC is an unsecure BC, the method provides security against false BC attacks caused by a second false BC generating traffic on the serial data bus. For example, the device may further comprise a transmit detect device to detect a transmission in a stub of the serial data bus that connects the BC to the serial data bus. In such instances, the method comprises the device detecting a transmission by the BC. In some instances of the method, the device detects BC command transmission by both monitoring the serial data bus and by detecting current in the stub of the serial data bus. In such instances, the method comprises invalidating any detected transmission determined to not be initiated by the BC.

In some instances of the method where the BC comprises a fixed silicon BC protocol sequencer and/or a BC that cannot be modified, the BC is considered a secure BC, and the method comprises the device detecting a command word transmission in the serial data bus or in a stub of the serial data bus that connects the BC to the serial data bus and determining whether the command word transmission was initiated by the BC or not by the BC. In such instances, the method may comprise determining whether the command was initiated by the BC either by direct integration with a BC sequencer in a processing circuit of the device, or by detection of a command word transmission by detecting current in the stub of the serial data bus. In such instances of the method, if the device determines the command word transmission was not initiated by the BC, then it determines that the command word transmission was initiated by a false BC and the method comprises the device invalidating the command word transmission initiated by the false BC.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1A:
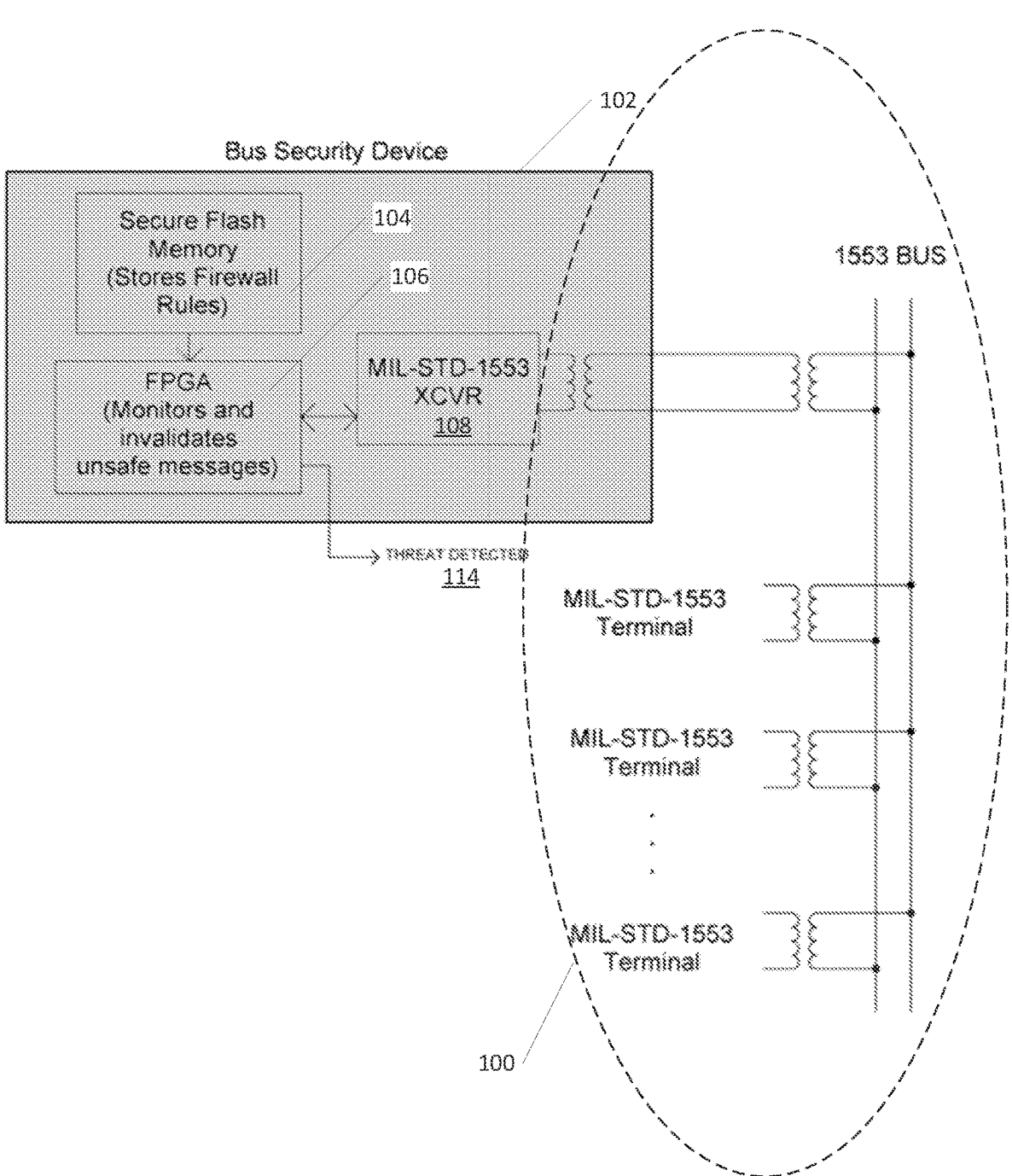
FIG. 1A is an illustration of a MIL-STD-1553 data bus that includes a stand-alone bus security device.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

Some of the components that comprise a MIL-STD-1553 communication bus include the bus controller (BC), the embedded remote terminal (a sensor or subsystem that provides its own internal 1553 interface), the stand-alone remote terminal (RT is used herein to refer to either the embedded remote terminal or the stand-alone remote terminal), and the bus monitor (BM). Generally, the data bus comprises twisted shielded pair wire data bus and may include optional isolation couplers. The bus controller's function is to provide data flow control for all transmissions on the bus. In this role, the bus controller is the sole source of communication. The system uses a command/response method. The embedded remote terminal comprises interface circuitry located inside a sensor or subsystem directly connected to the data bus. It performs the transfer of data in and out of the subsystem as controlled by the bus controller. This type of terminal usually does not have bus controller capability. However, if the sensor itself is fairly intelligent, it can become a candidate for the backup bus controller function. Generally, an intelligent subsystem (i.e., computer based) can become a backup bus controller if a second computer, equal in function to the primary, is unavailable. The stand-alone remote terminal is the only device solely dedicated to the multiplex system. It is used to interface various subsystem(s), which are not 1553 compatible with the 1553 data bus system. Its primary function is to interface and monitor transmission in and out of these non-1553 subsystem(s).

The bus monitor "listens" to all messages, and subsequently collects data, from the data bus. Primary applications of this mode of operation include: collection of data for on-board bulk storage or remote telemetry; or use within a "hot" or off-line back-up controller to observe the state and operational mode of the system and subsystems.

Regarding the data bus, the standard defines specific characteristics for the twisted pair shielded cable. Notice 2 of the standard tightens these requirements and adds a definition for connector polarity.

The data bus coupler unit isolates the main bus from the terminals. MIL-STD-1553B allows two types of data bus interface techniques; direct coupling and transformer coupling. It is to be appreciate that while the figures herein typically illustrate transformer coupling, that direct coupling may also be used and is contemplated within the scope of the claims. Subsystems and 1553 bus elements are interfaced to the main data bus by interconnection buses (called "stubs"). These stubs are either connected directly to the main bus or interfaced via data bus couplers. The data bus couplers contain two isolation resistors (one per wire) and an isolation transformer (with a ratio of 1 to the square root of 2). The purpose of the data bus couplers is to prevent a short on a single stub from shorting the main data bus. The selection of the value of the resistors, the transformer's turn ratio, and the receiver impedance are such that the stub appears to the main bus as a "clean interface" (i.e., high impedance). This technique reduces the distortion caused on the main data bus by the termination. Main buses utilizing direct coupled stubs must be designed to withstand the impedance mismatch of the stubs. This can be reduced by minimizing stub length (less than one foot) and "tuning" the bus by terminal spacing. Designs not using data bus couplers should be carefully analyzed and tested to determine if waveform distortion is significant enough to cause receiver problems. The other risk associated with direct coupled stubs is a short on a stub will cause the main bus to fail. The obvious advantage to direct coupled stubs is the elimination of the logistical problems associated with another device and the installation problem of locating these small devices.

Disclosed and described herein are security mechanisms that use simultaneous transmission on the data bus to invalidate a message which is considered a threat. A relatively short transmission burst injected onto the bus is designed to create a collision with either data or status word transmission and causes the message to be invalidated. This technique can effectively invalidate almost all MIL-STD-1553 message types. The invalidation signal is optimized to interfere with and invalidate the word immediately following the detection of the threat. This signal may be at a higher frequency than normal 1553 traffic. The transmit level of the invalidation signal is at or above the maximum level specified in MIL-STD-1553 to ensure the message is invalidated by corrupting the Manchester encoding or sync encoding. The disclosed embodiments are easily integrated into existing systems, requiring no modifications to existing legacy terminals (BCs, RTs, BMs) on the bus. The security architecture is open, predictable, and fully defined. The response of the security device to threats is based on strict pre-defined rules. The security rules can be programmed in at least two different ways: hard-coded in hardware description language (HDL), or loaded into FPGA lookup table from non-volatile memory. The security architecture can neutralize a large number of potential threats on a MIL-STD-1553 bus with unsecured legacy RTs and/or BC. The security mechanism does not interfere at all with normal bus traffic, but remains entirely passive. The security mechanism can be implemented in existing FPGA-based hardware platforms. The security mechanism can be integrated with third party security algorithms. The disclosed embodiments secure the entire bus (all terminals) by monitoring message traffic. Embodiments may be implemented as a standalone device, or can be integrated with a bus controller to prevent all other terminals from initiating messages. In some instances, embodiments of the security device give an indication of the presence of abnormal activity or threats that have been detected. Can be used in at least two different use cases: in some instances, embodiments may be implements as a completely independent security agent which polices the bus for unacceptable messages and when it detects them it invalidates them. Optionally and/or additionally, embodiments can be used in conjunction with a secure or unsecure bus controller to invalidate all messages not originated by the bus controller.

FIG. 1A is an illustration of a MIL-STD-1553 data bus 100 that includes a stand-alone bus security device 102. As shown in FIG. 1A, this example of a bus security device 102 comprises a memory 104 that is in communication with a processing circuit 106 (e.g., a processor, a field-programmable gate array (FPGA), an ASIC, and the like). An FPGA is a device used in electronic circuits. An FPGA is a semiconductor device including programmable logic blocks and interconnects. An FPGA is capable of being programmed after manufacture, for example, using a hardware description language (HDL). FPGAs are known in the art and therefore not described in further detail here. Alternatively, in other implementations, the processing circuit 106 may include an application-specific IC (ASIC). An ASIC is a customized IC chip. Unlike an FPGA, an ASIC is not capable of being programmed after manufacture. ASICs are known in the art and therefore not described in further detail here. In some instances, the memory 104 may be integrated into a comprise a part of the processing circuit 106. In some instances the memory 104 may be flash memory. The processing circuit 106 monitors the data bus 100 in accordance with security rules stored in the memory 104. For example, the security rules may be hard-coded in HDL, or loaded into FPGA lookup table from non-volatile memory. The processing circuit 106 uses a transceiver 108 to monitor the data bus 100. The transceiver 108 may be connected to the data bus 100 by a transformer, or directly, as described herein. If the processing circuit 106 detects an anomaly (e.g., an event (e.g., message) on the data bus 100 that is characterized as a threat by the rules stored in the memory 104), then the processing circuit 106 causes the transceiver 108 to inject an invalidation signal onto the data bus 100 to counteract the anomaly. The processing circuit 106 causes a relatively short transmission burst to be injected onto the data bus 100 that is designed to create a collision with either data or status word transmission and causes the message identified as a threat to be invalidated. The invalidation signal is optimized to interfere with and invalidate the word immediately following the detection of the threat. This signal may be at a higher frequency than normal 1553 traffic. The transmit level of the invalidation signal is at or above the maximum level specified in MIL-STD-1553 to ensure the message is invalidated by corrupting the Manchester encoding or sync encoding. The anomaly is identified, using the security rules, based on message content. In some instances, the stand-alone security device may provide an indication 114 that a anomaly has been detected. This indication 114 may be in the form of an electronic signal, and/or audible or visible indicators.

The stand-alone security device 102 secures the entire bus (all terminals) 100, and requires no changes to the system. A typical use case for the stand-alone security device 102 of FIG. 1A might be for securing a MIL-STD-1553 maintenance port.

Allowed messages and threats must be pre-determined and completely defined in terms of command word, and possibly also in terms of data words if out-of-bounds data constitutes a legitimate threat. These definitions are stored in the memory 104 in the form of security rules. Existing bus traffic without anomalies can potentially be analyzed to help determine the set of allowed messages. The security device 102 transmits at full MIL-STD-1553 power levels to ensure that the invalidation signal reliably corrupts the threat message.

Figure 1B:
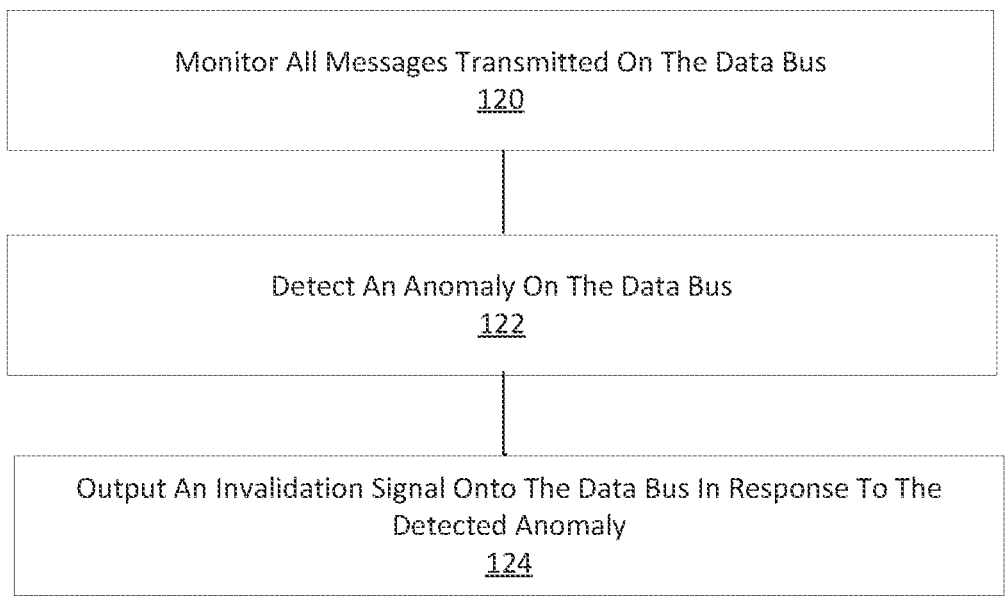
FIG. 1B is a flowchart illustrating a method of securing a MIL-STD-1553 data bus using a stand-alone security device such as the one described in reference to FIG. 1A.

FIG. 1B is a flowchart illustrating a method of securing a MIL-STD-1553 data bus using a stand-alone security device such as the one described in reference to FIG. 1A. At 120, the security device monitors all messages transmitted on the data bus. At 122, the security device detects an anomaly on the data bus. For example, the anomaly may comprise a non-allowed command word. Optionally, the anomaly may comprise an out-of-bounds data word. At 124, the security device outputs an invalidation signal onto the data bus in response to the detected anomaly. The invalidation signal comprises a transmission burst that interferes with normal 1553 transmission. The invalidation signal results in a collision and corrupts either the data word or status word transmission of the non-allowed message and prevents successful message completion. After the invalidation signal has been transmitted, the security device will continue monitoring traffic on the bus. If the data bus is a dual-redundant 1553 channel, then an independent security circuit services each bus of the dual-redundant 1553 channel. In some instances, the security device also generates a signal indicating that a threat was detected and the bus may be compromised.

Using the security device shown and described in FIGS. 1A and 1B, the security method is able to secure the entire bus based on message content only. It makes no distinction regarding which physical terminal may be participating in message traffic. This also implies that threats can only be defined in terms of message content, but cannot be defined based on command/data source or destination. The security device may be coupled to the bus in any location and can be either direct or transformer-coupled. When power to the security device is removed or the security device is disabled, the security function is disabled and the bus operates normally. This is a desirable feature.

The special case of broadcast mode commands without a data word, and by extension all broadcast commands, require special consideration to invalidated. There are seven of these broadcast mode commands without data defined by 1553. The nature of these commands is such that an unauthorized execution might alter the state of RTs in an undesirable way, but it would likely not pose a specific threat to any particular RT. If broadcast mode commands are not supported by RTs in a system, then this problem generally disappears. The Air Force strongly discourages the use of ANY broadcast commands in their systems because it eliminates the command-response handshake which contributes to the robustness of MIL-STD-1553. Broadcast commands without data require the invalidating transmission to begin during the transmission time of the command word. This means that the security device cannot wait to receive the whole command word before making the decision to invalidate. Therefore, to work reliably, the security device would need to make the decision to invalidate as soon as it was determined that the command was a broadcast command. This means that ALL broadcast commands would not be allowed if any broadcast commands without data were to be invalidated. The following is a list of these commands: Synchronize; Initiate Self-Test; Transmitter Shutdown; Override Transmitter Shutdown; Inhibit Terminal Flag Bit; Override Inhibit Terminal Flag Bit; and Reset Remote Terminal.

Uses of the security device and method disclosed in relation to FIGS. 1A and 1B include adding security to a MIL-STD-1553 maintenance port where the threat might come from a maintenance computer with compromised software which attempts to generate message traffic inappropriate during maintenance. In another use, the security method may also be appropriate for securing an otherwise unsecured operational bus where the threat might come from a terminal generating message traffic that is inappropriate during normal operation (for example, running maintenance type traffic during normal operation).

Figure 2A:
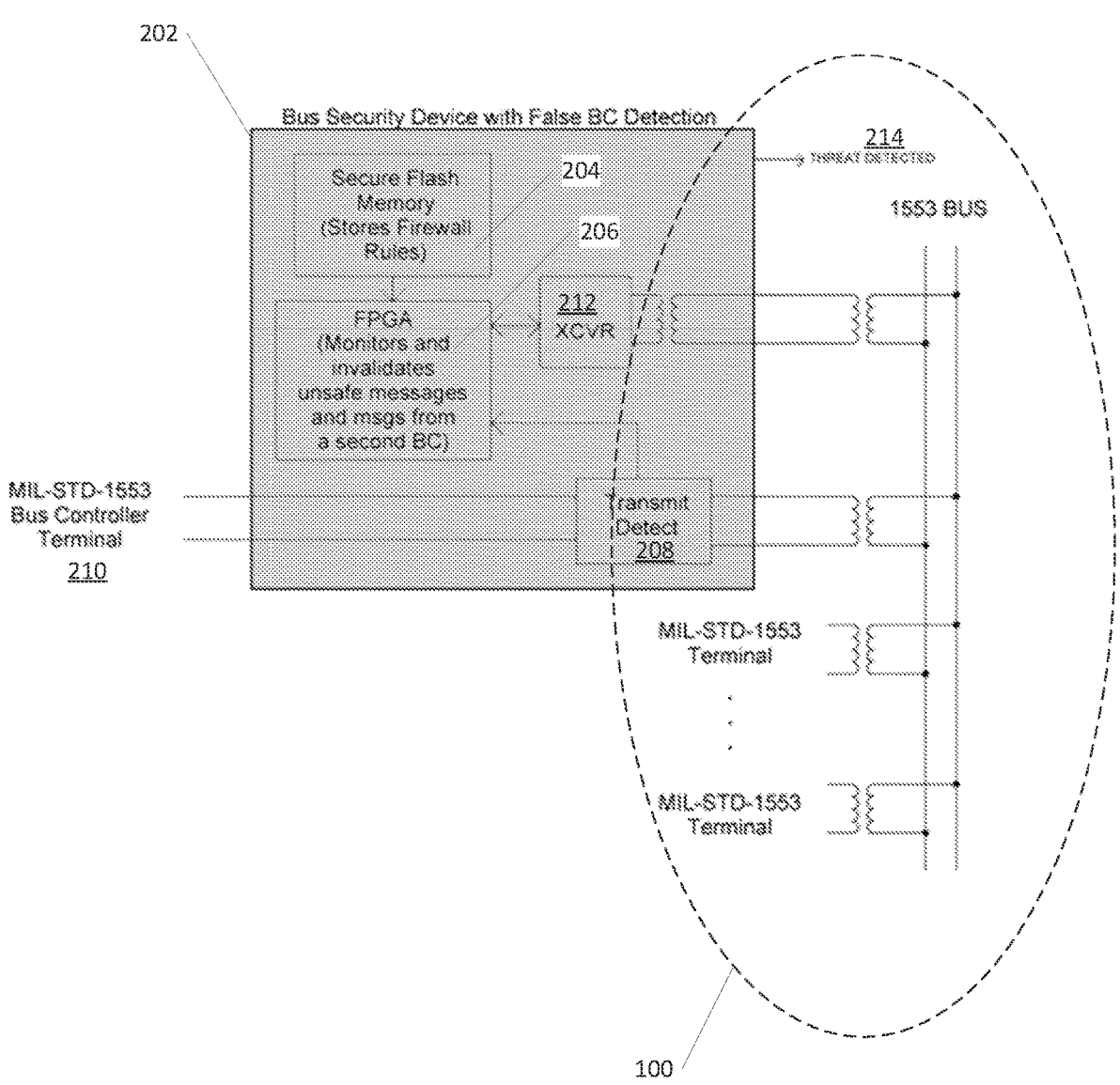
FIG. 2A illustrates another embodiment of a security device for providing security to a MIL-STD-1553 data bus where the security device is integrated with an unsecured bus controller (BC) to secure against false BC attacks.

FIG. 2A illustrates another embodiment of a security device for providing security to a MIL-STD-1553 data bus where the security device is integrated with an unsecured bus controller (BC) to secure against false BC attacks. It is to be noted that this use case adds additional security against a second false BC generating traffic. In this implementation, the entire bus (all terminals) is secured based on message content alone. Furthermore, this implementation requires no changes to the BC or RTs in the system. It detects BC command transmission by both monitoring the bus and by detecting current in the BCs stub. If a MIL-STD-1553 system contained redundant/multiple BCs, only one BC could be active at any given time and the active/inactive status of the BC would need to be reported to the security device. A typical use case for this implementation would be for securing a MIL-STD-1553 bus which contains a bus controller that uses a fixed silicon BC protocol sequencer or any other BC which cannot be modified.

As shown in FIG. 2A, this example of a bus security device 202 comprises a memory 204 that is in communication with a processing circuit 206 (e.g., a processor, a field-programmable gate array (FPGA), and the like). In some instances, the memory 204 may be integrated into a comprise a part of the processing circuit 206. In some instances the memory 204 may be flash memory. The processing circuit 206 monitors the data bus 100 in accordance with security rules stored in the memory 204. For example, the security rules may be hard-coded in HDL, or loaded into FPGA lookup table from non-volatile memory. The processing circuit 206 uses a transmit detect device 208 to detect a transmission by the bus controller 210. The device 202 is further connected to the data bus 100 using a transceiver 212 connected to the data bus 100. The transceiver 212 may be connected to the data bus 100 by a transformer, or directly, as described herein. If the processing circuit 206 detects an anomaly (e.g., an event (e.g., message) transmitted by the BC 210 that is characterized as a threat by the rules stored in the memory 204, then the processing circuit 206 causes the transceiver 212 to inject an invalidation signal onto the data bus 100 to counteract the anomaly. The processing circuit 206 causes a relatively short transmission burst to be injected onto the data bus 100 that is designed to create a collision with either data or status word transmission and causes the message identified as a threat to be invalidated. The invalidation signal is optimized to interfere with and invalidate the word immediately following the detection of the threat. This signal may be at a higher frequency than normal 1553 traffic. The transmit level of the invalidation signal is at or above the maximum level specified in MIL-STD-1553 to ensure the message is invalidated by corrupting the Manchester encoding or sync encoding. The anomaly is identified, using the security rules, based on message content. The security device 202 may also provide an indication 214 that a threat has been detected.

Figure 2B:
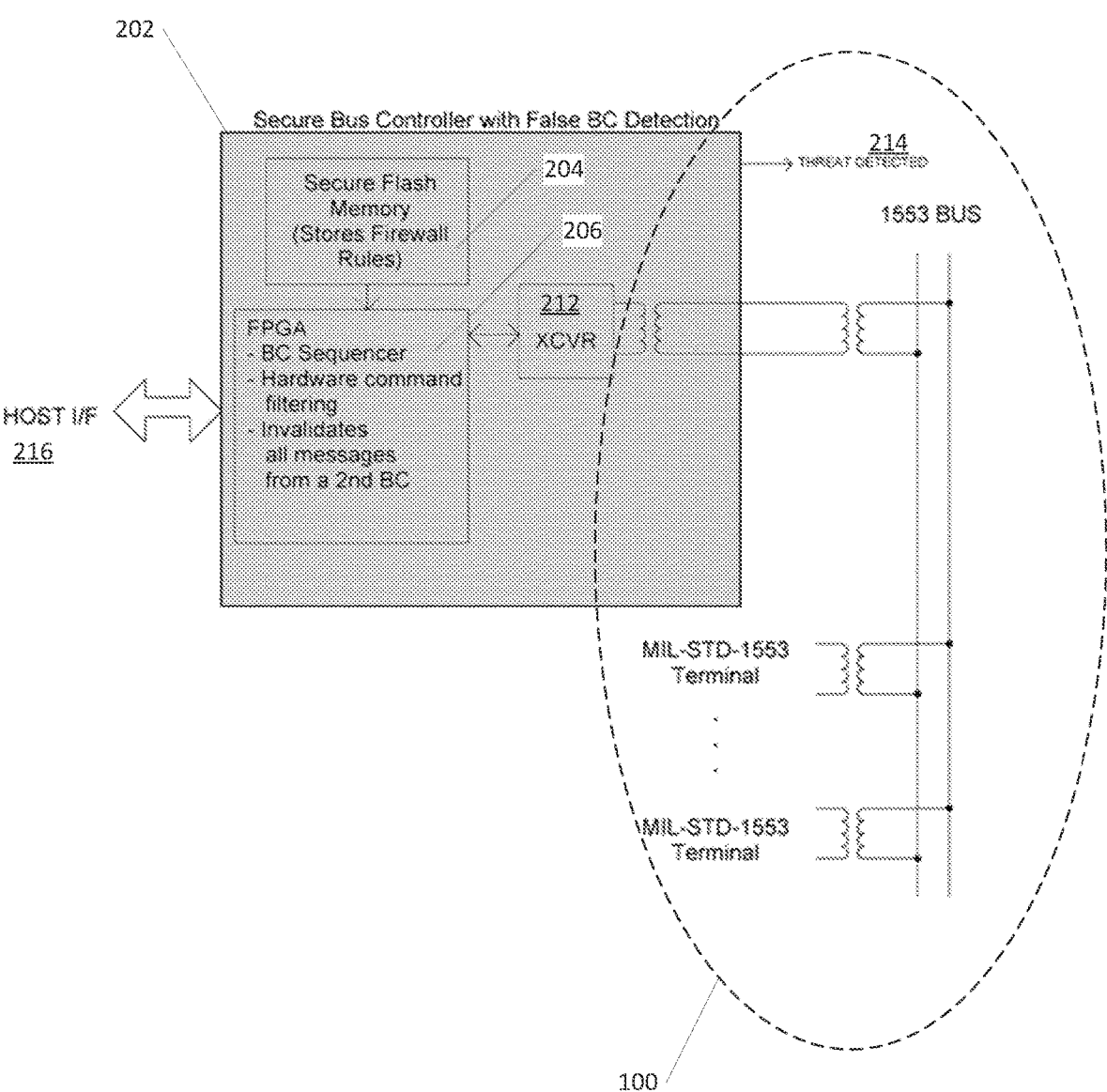
FIG. 2B is an illustration of a security device integrated with a secure BC to secure against false BC attacks.

FIG. 2B is an illustration of a security device integrated with a secure BC to secure against false BC attacks. It is to be noted that this use case adds additional security against a second false BC generating traffic. This implementation secures the entire bus (all terminals) based on message content alone, and requires no changes to the RTs in the system. If a MIL-STD-1553 system contains redundant/multiple BCs, only one BC could be active at any given time and the active/inactive status of the BC would need to be reported to the security device.

FIG. 2B illustrates integration of a security device with a secure bus controller. As shown in FIG. 2B, the processing circuit 206 interfaces with host 216, and provides BC sequencing, hardware command filtering and invalidates all messages from any additional (i.e., second) BC. In this implementation, the security device determines which commands were initiated by the true bus controller, either by direct integration with the BC sequencer in the same FPGA, or by detection of command word transmission via current in the bus stub. The security device must be able to transmit at full MIL-STD-1553 power levels to ensure that the invalidation signal reliably overcomes the threat message.

Figure 2C:
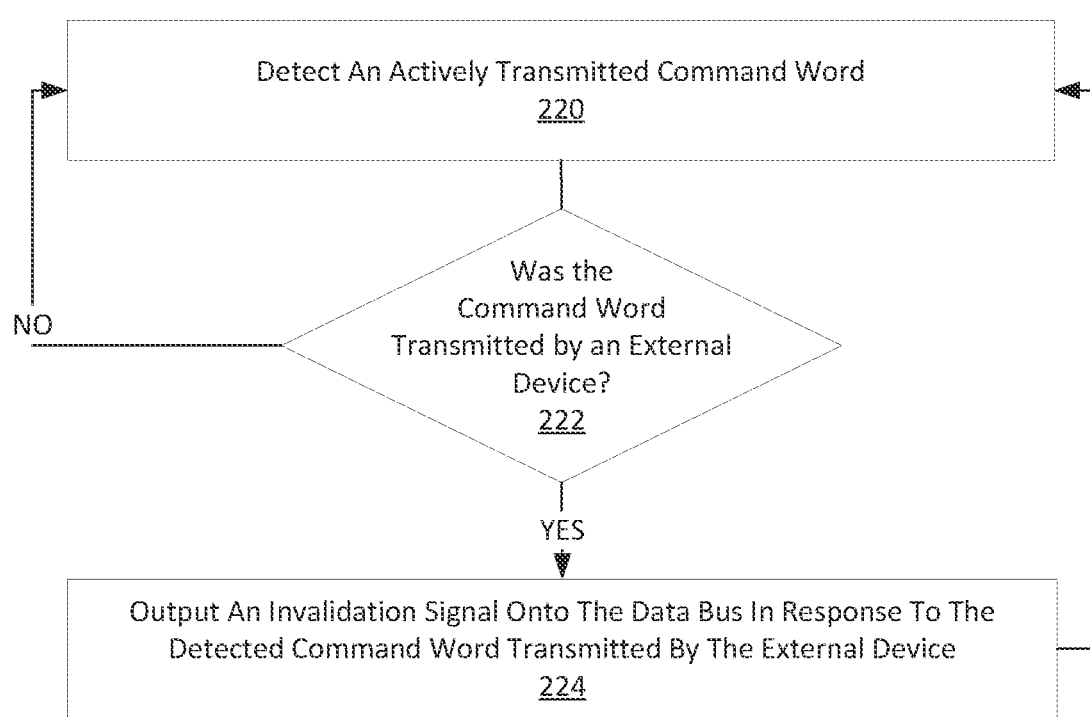
FIG. 2C illustrates a flowchart for a method of securing a MIL-STD-1553 data bus using the implementations of a security device as shown in FIGS. 2A and 2B.

FIG. 2C illustrates a flowchart for a method of securing a MIL-STD-1553 data bus using the implementations of a security device as shown in FIGS. 2A and 2B. As shown in FIG. 2C, at 220, the security device detects when the BC is actively transmitting a command word. At 222, it is determined if an external device (i.e., not the BC) transmits a command word. If, at 222, it is determined that an external device transmitted the command word, then the message will be invalidated at 224. In other words, when bus activity is detected during a period when the BC is NOT actively transacting a message, the security device outputs an invalidation signal on the same bus in which the activity was detected. The invalidation signal is comprised of a transmission burst which is an injection of a non-standard AC signal which interferes with normal 1553 transmission during data word or status word transmission time. The invalidation signal causes a collision and corrupts the attempted message from the false BC. If, at 222, it is determined that the command word was transmitted by the BC (not by an external device), then the process returns to 220 and continues to monitor for a command word. At 224, after the invalidation signal has been transmitted, the security device will return to 220 and continue looking for spurious commands and activity on the bus. An independent security circuit services each bus on a dual-redundant 1553 channel. The security device may optionally generate a signal indicating that a threat was detected and the bus may be compromised.

In the implementations shown in FIGS. 2A-2C, external threats do not need to be defined; all messages originated from a source other than the BC in which the security device is integrated are invalidated. Internal threats from the BC itself can still be neutralized, either by hardware filtering in the secure BC, or by simultaneous transmission when used with an unsecured BC. Use cases of the implementations shown in FIGS. 2A-2C include adding security to a MIL-STD-1553 bus where the threat might come from a false bus controller generating otherwise acceptable message traffic. This security method, when integrated with a secure bus controller, provides the most complete security, which includes detecting and neutralizing the following threats: illegal commands generated from the BC itself (because the BC is secured); all messages generated by a second false BC; and, if data word checking is used, it can also prevent out-of-bounds data from RTs from successfully transferring.

In summary, the above-disclosed implementations of a device and methods for securing a MIL-STD-1553 bus requires no modifications to existing legacy terminals (BCs, RTs, BMs) on the bus; can be easily integrated into existing systems as a standalone device; the implementation of the security device are small and require little power; does not interfere with normal traffic, and remains entirely passive (in monitor mode); secures the entire bus; the security architecture is open, predictable, and fully defined. The response of the security device to threats could be based on strict pre-defined rules; can neutralize most potential threats on a MIL-STD-1553 bus which has potentially unsecured legacy RT and/or BC terminals; security mechanism can be integrated into existing FPGA-based hardware platforms; can be integrated with a bus controller to prevent a non-authorized (another) BC from generating ANY commands, even otherwise legal ones; and can take advantage of machine-learning techniques to automate the creation of security rules.

Example Computing Device

Figure 3:
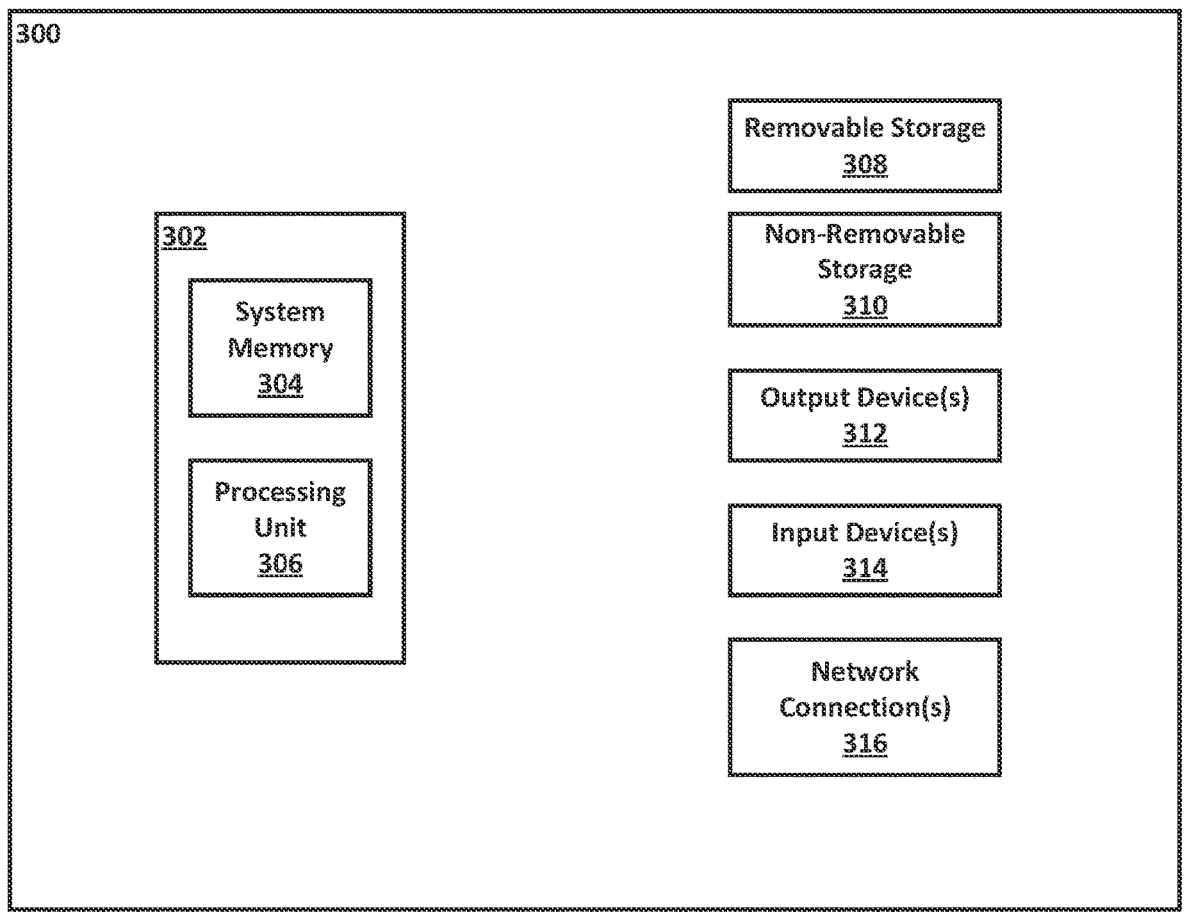
FIG. 3 is an example computing device.

Referring to FIG. 3, an example computing device 300 upon which the methods described herein may be implemented is illustrated. The computing device 300 of FIG. 3 may comprise all or a portion of a bus security device, as described herein. It should be understood that the example computing device 300 is only one example of a suitable computing environment upon which the methods described herein may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 300 typically includes at least one processing unit 306 and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300. The computing device 300 may also include a bus or other communication mechanism for communicating information among various components of the computing device 300.

Computing device 300 may have additional features/ functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 312 such as a display, speakers, printer, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 306 for execution. Example tangible, computer-readable media may include, but is not limited to, volatile media, non-volatile media, removable media, and non-removable media implemented in any method or technology for storage of information such as computer readable instructions, data structures, program modules or other data. System memory 304, removable storage 308, and non-removable storage 310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

The disclosed MIL-STD-1553 security devices and methods were implemented with existing Abaco™ hardware to demonstrate the ability to provide effective security on the MIL-STD-1553 bus. The following was demonstrated: the ability to invalidate disallowed commands was verified; messages with out-of-bounds data was invalidated; and the ability to prevent the generation of any commands from a false BC was demonstrated. It was also found that the implementations can be easily integrated into existing systems; requires no modifications to existing legacy terminals (BCs, RTs, BMs) on the bus; can secure the entire bus (all terminals) by monitoring message traffic; and that security architecture is open, predictable, and fully defined. The response of the security device to threats is based on strict pre-defined rules.

Figure 4:
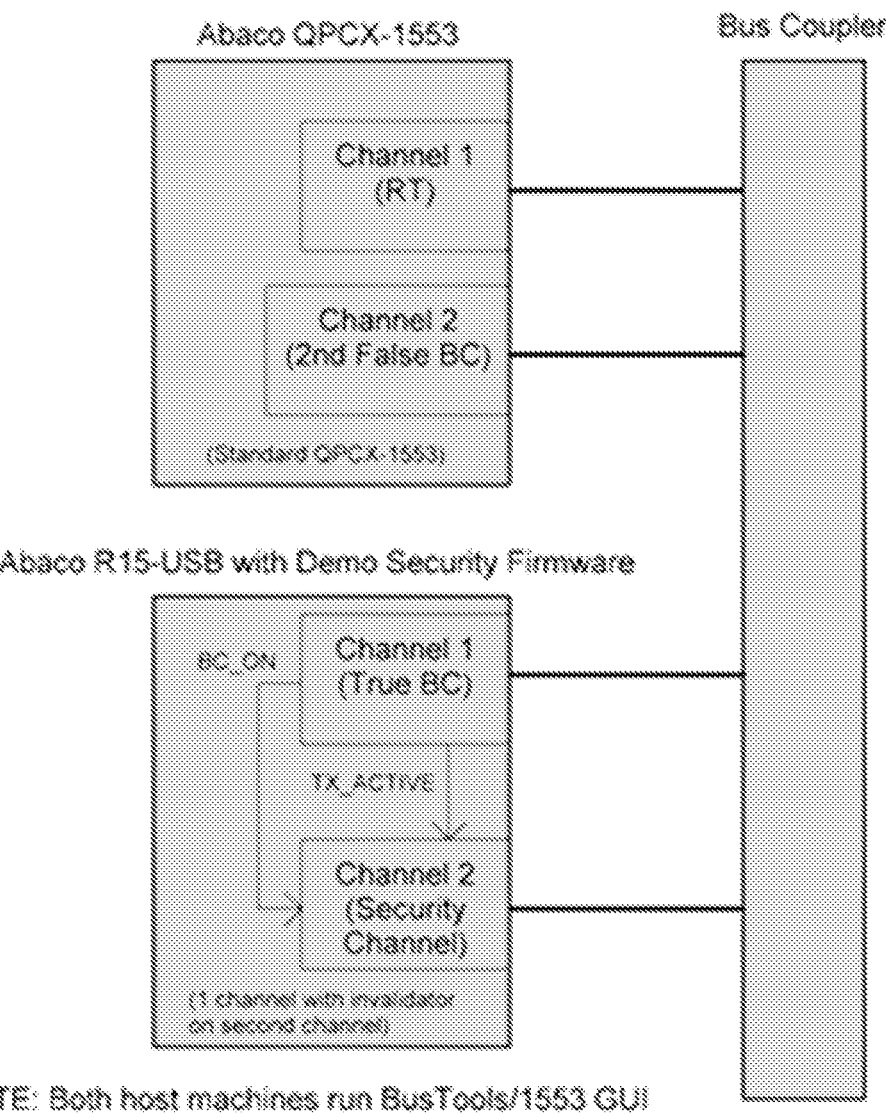
FIG. 4 is an exemplary setup for demonstrating securing a MIL-STD-1553 data bus using the implementations described herein.

Referring to the demonstration setup of FIG. 4, an Abaco R15-USB MIL-STD-1553 module was used with custom firmware to act as a standalone security device. Note that this device only outputs a nominal 1553 transmit signal, NOT a maximum or beyond maximum level. Two Abaco 1553 channels on an Abaco QPCX-1553 were used, one acting as a remote terminal and one as a malicious bus controller. The security device was arbitrarily programmed to allow all traffic with the exception of these command and data word combinations: Command: RT1, RX, Subaddress field equal to the word count field; Command: RT1, TX, Subaddress field equal to the word count field; Any messages with a data word equal to 0xDEAD; and All broadcast commands. The initial invalidation signal was 24 periods of a 1.25 MHz square wave. Other invalidation signals and methods are contemplated within the scope of the claims of this application. still under consideration and more testing and analysis will be performed.

Figure 5A:
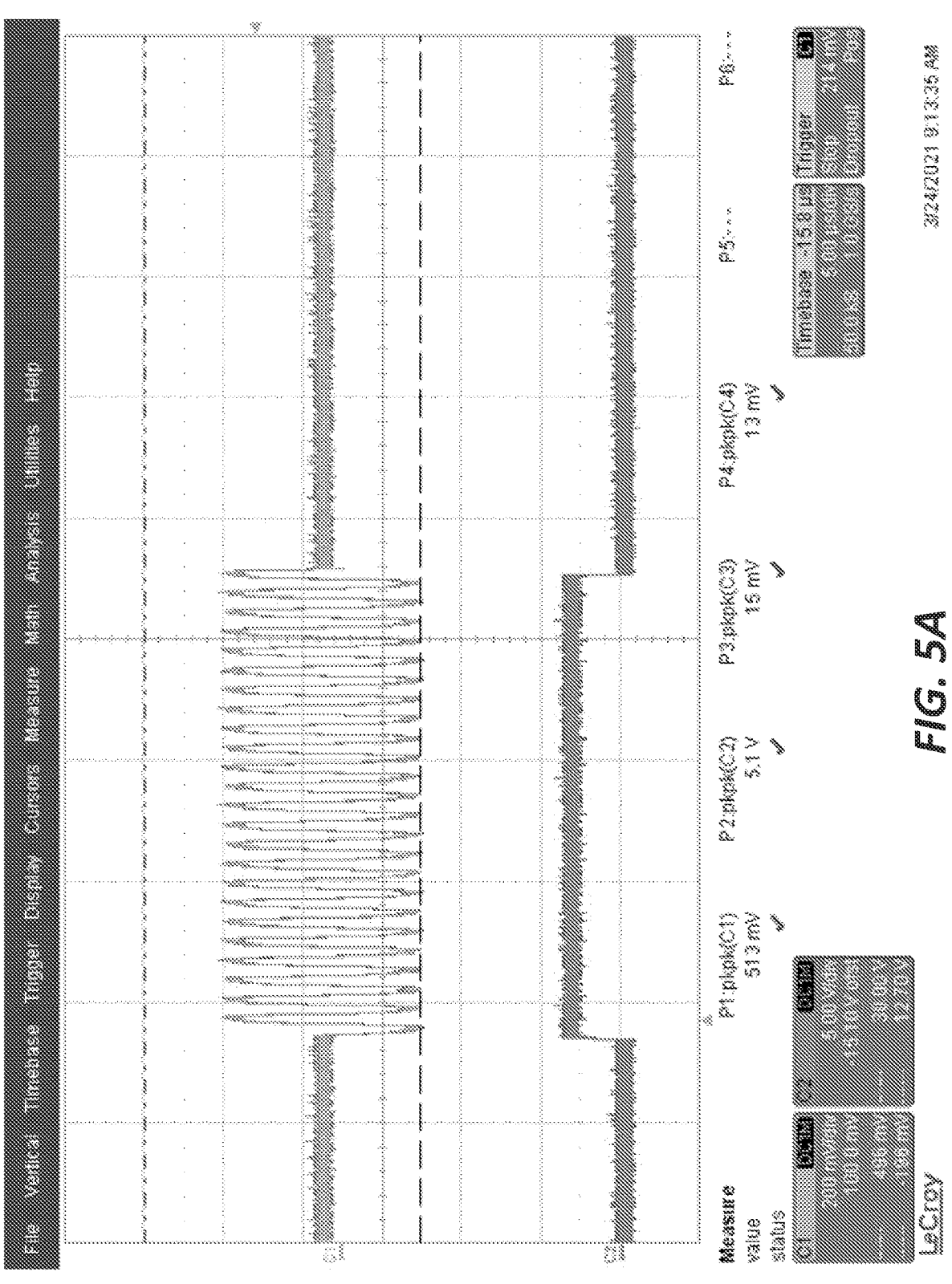
FIGS. 5A-5G show examples of timing diagrams showing messages with and without invalidation.
Figure 5B:
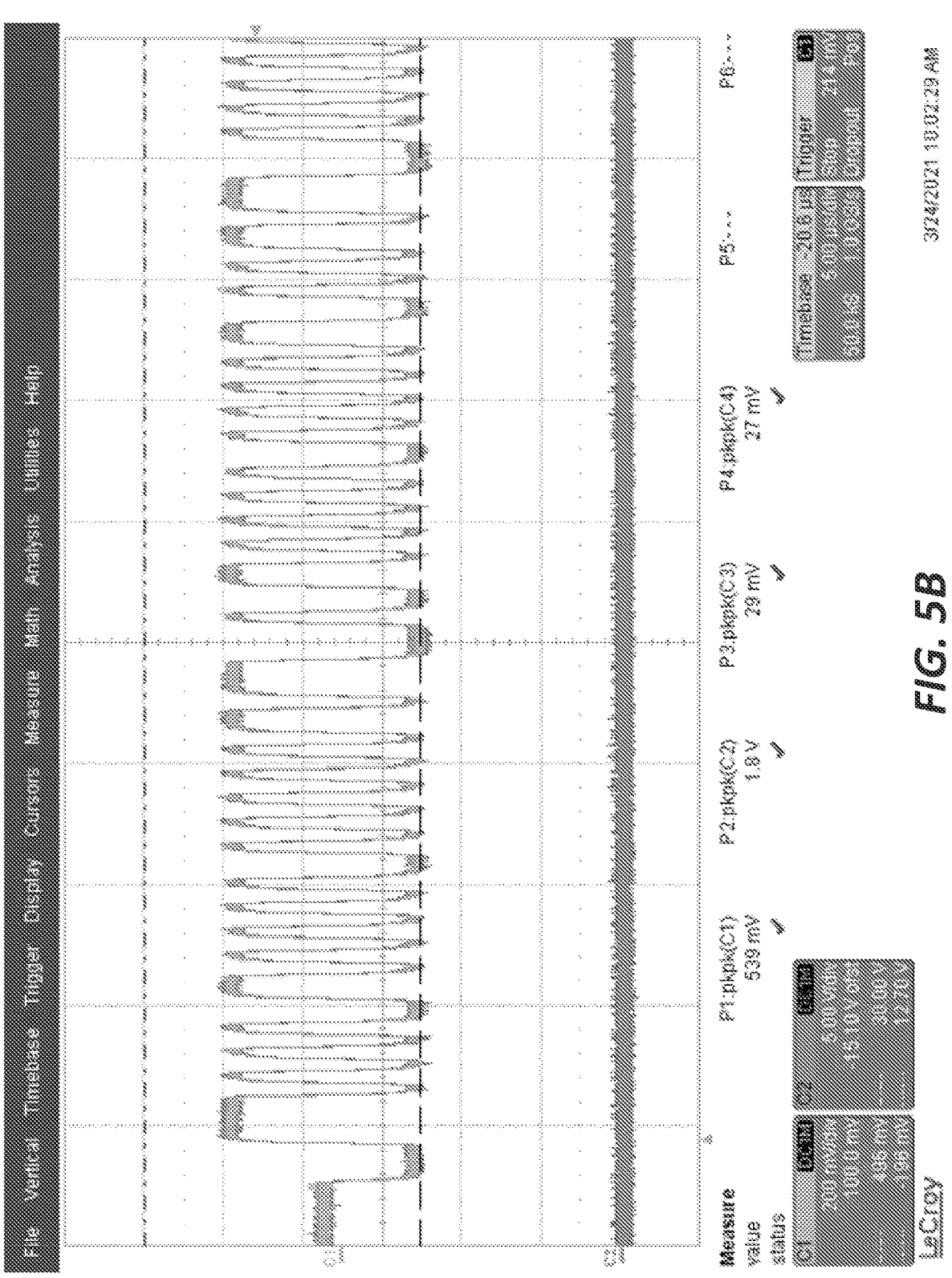
Figure 5C:
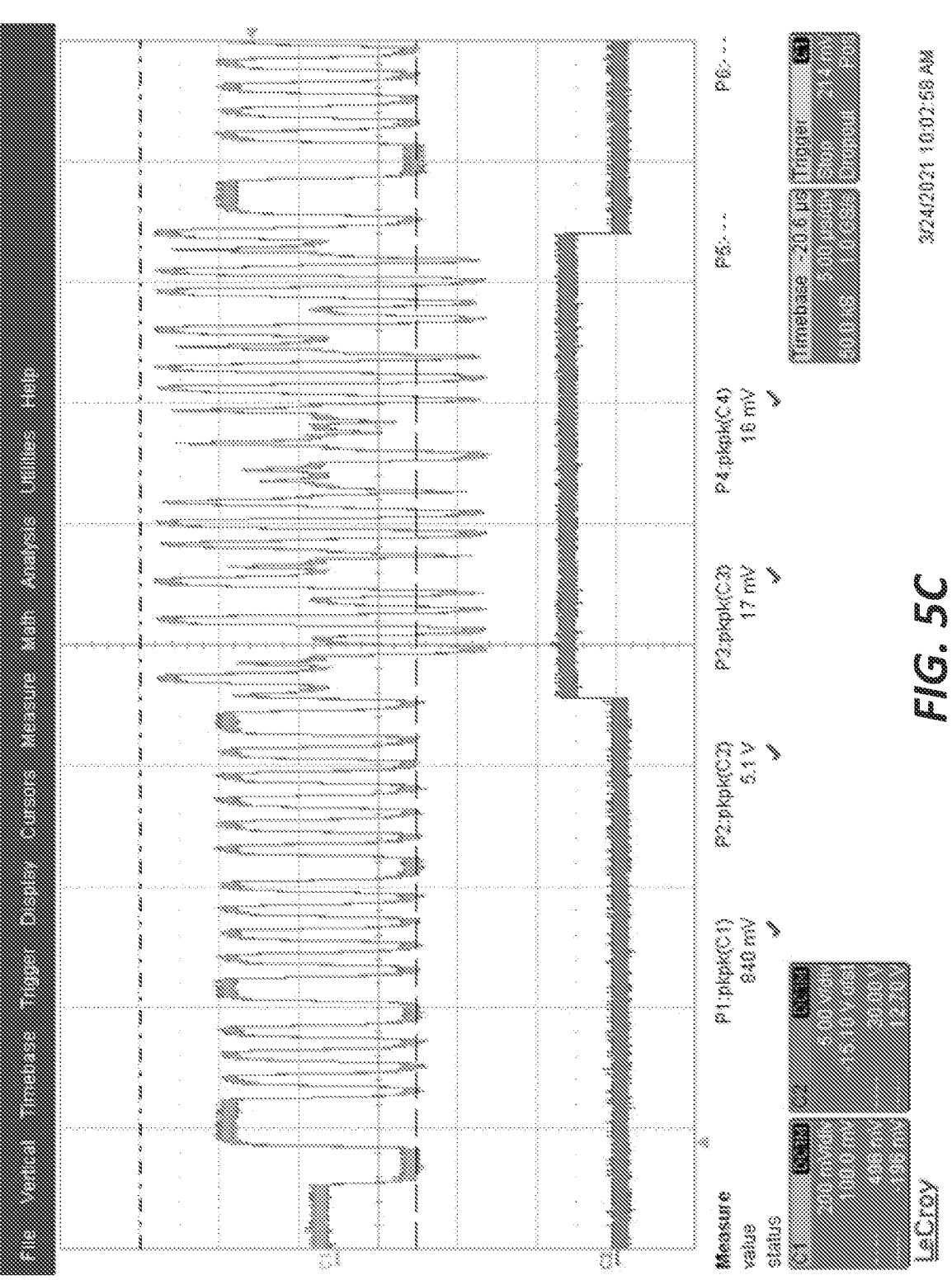
Figure 5D:
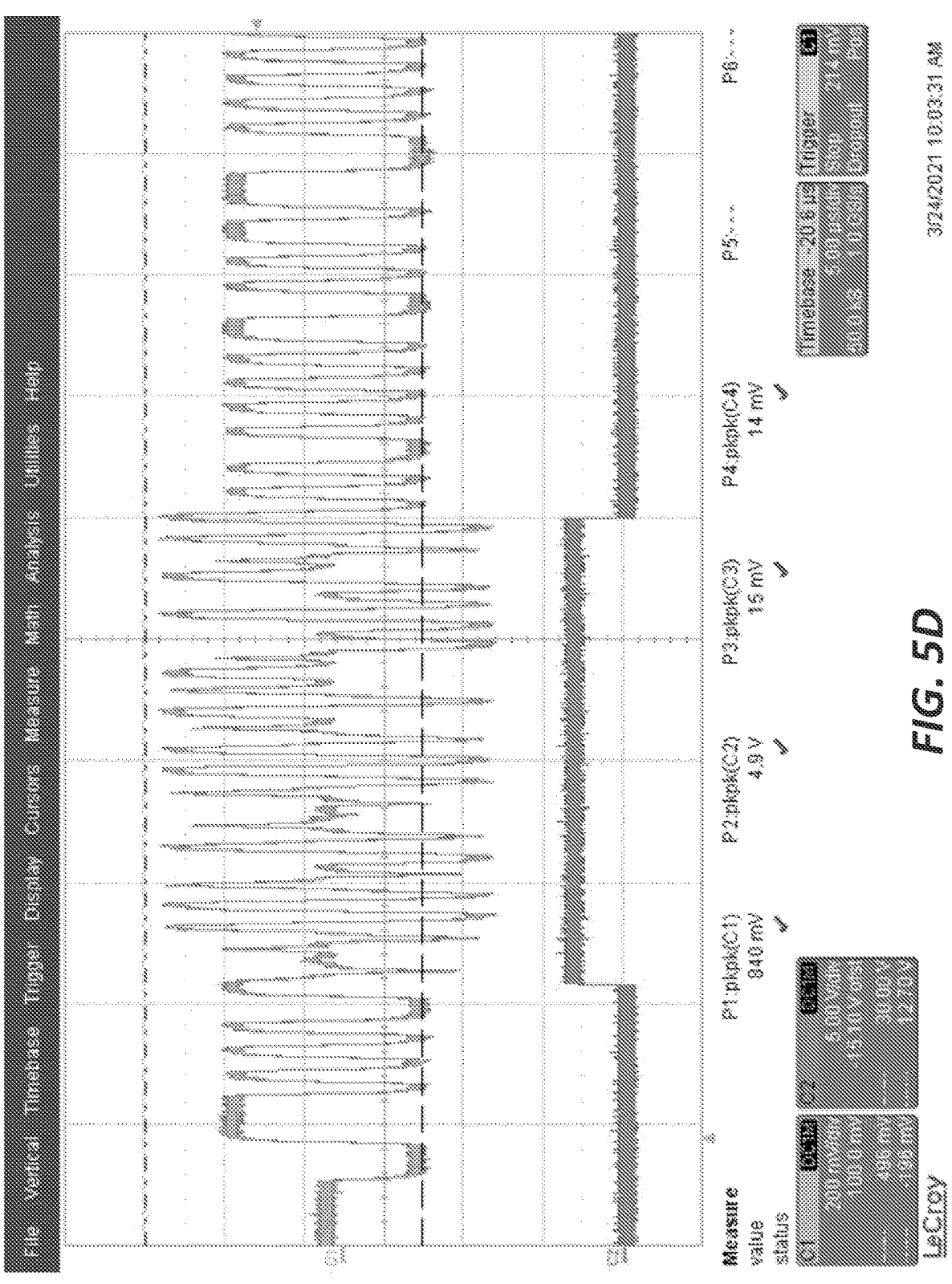
Figure 5E:
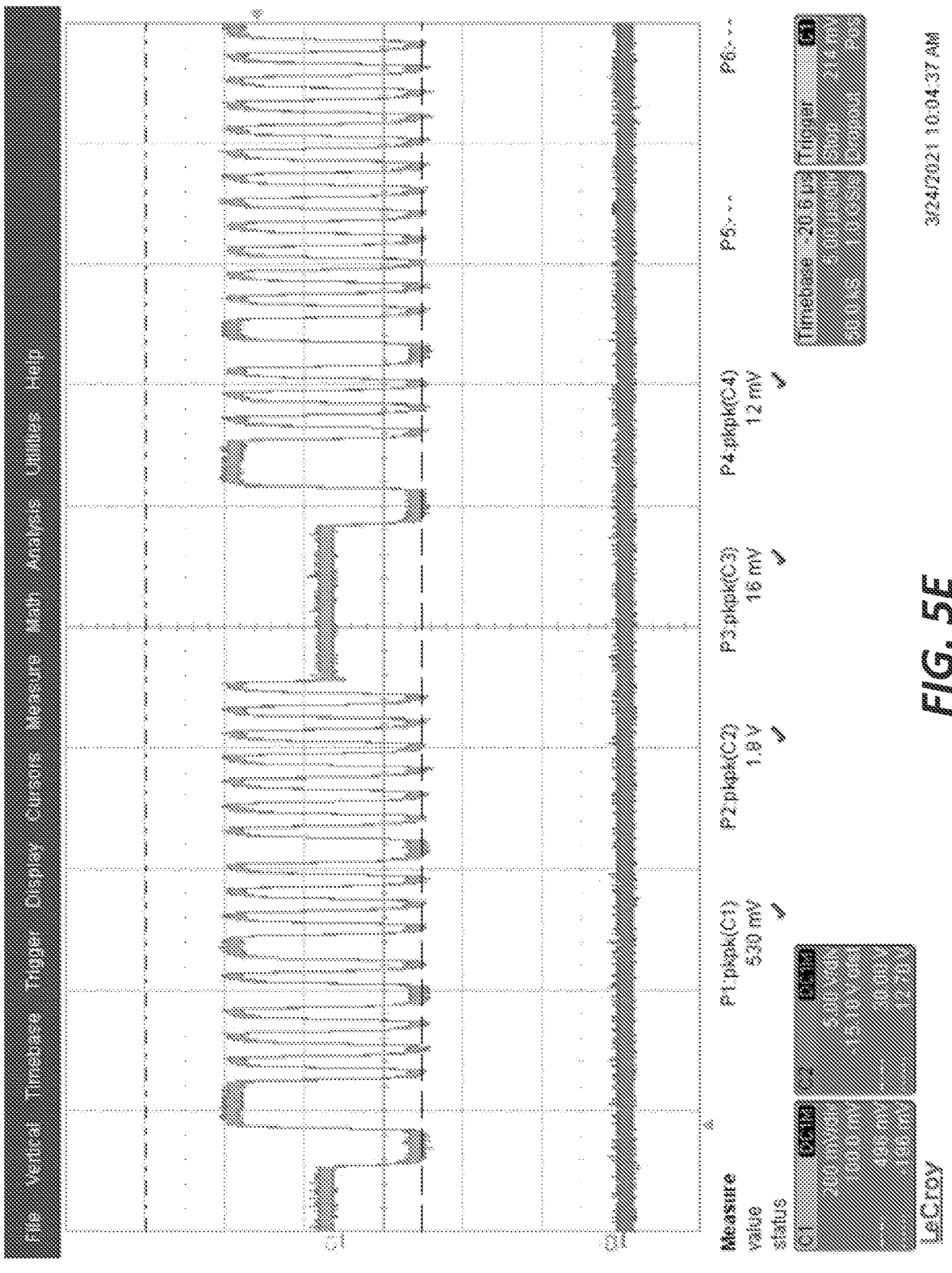
Figure 5F:
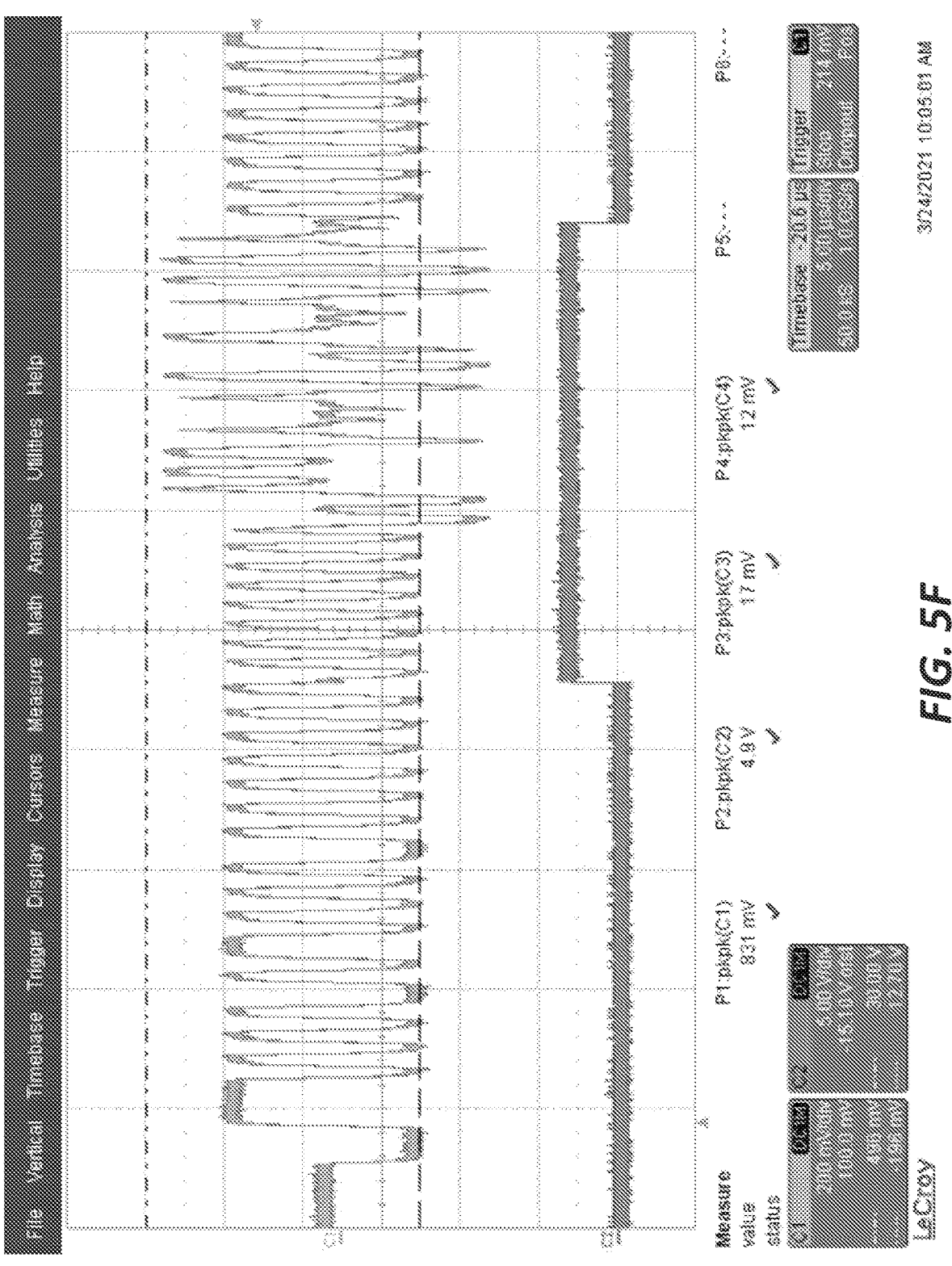
Figure 5G:
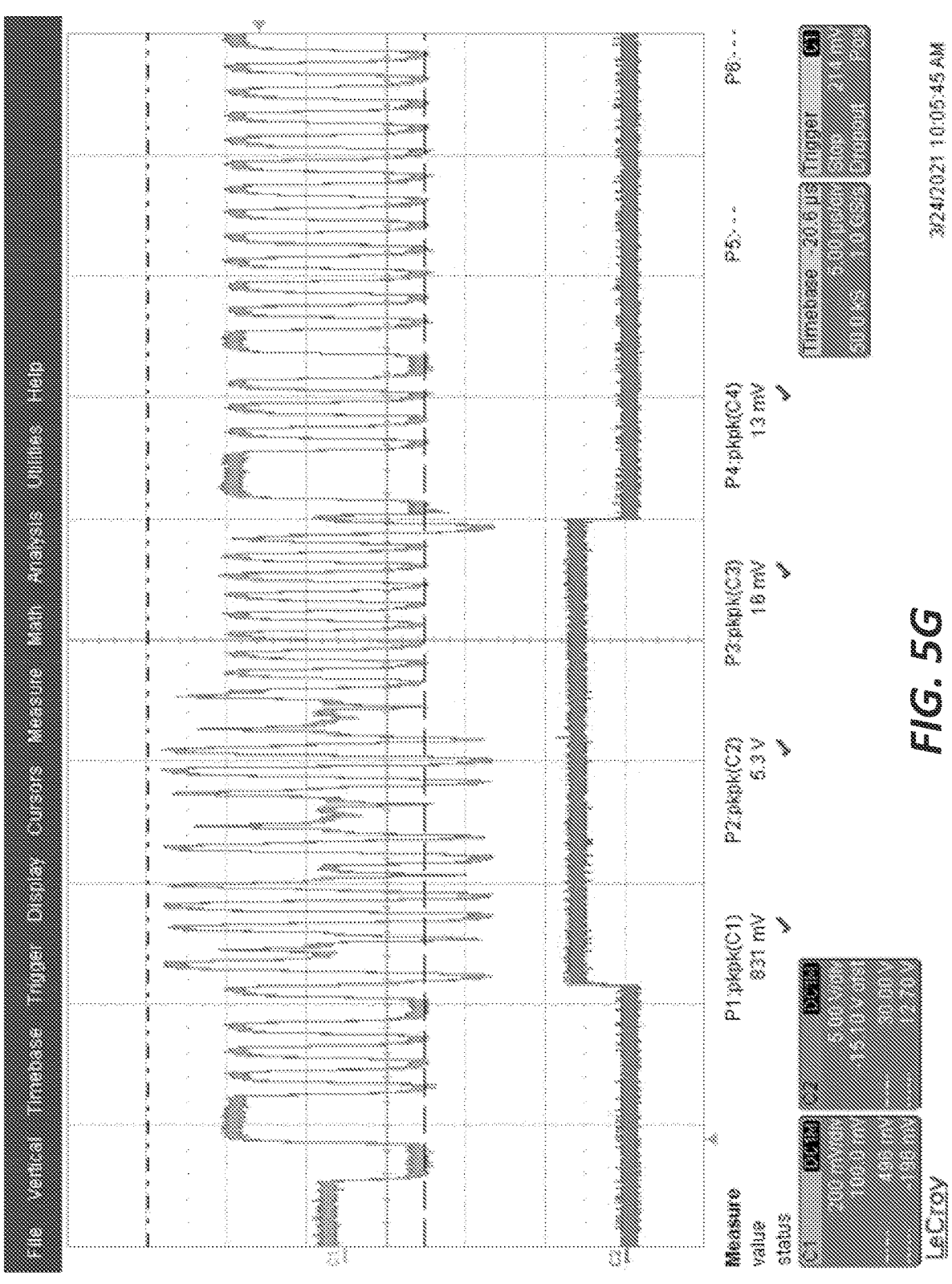

Referring to FIG. 4, it is to be appreciated that the security function can be integrated into a single channel with the BC/RT/BM terminal, but for the demonstration a separate channel was used as an example of how security can be added to an existing unsecure terminal. The results of the demonstration are that: (1) Initial experiments verified that the invalidation signal successfully prevented completion of the disallowed messages, but did not interfere with allowed traffic. Over 10 million of each of the disallowed messages were attempted and ALL messages were effectively invalidated. (2) The ability to invalidate disallowed commands was verified. (3) Messages with out-of-bounds data was invalidated. (4) The ability to prevent the generation of any commands from a false BC was demonstrated. (5) All broadcast commands were invalidated. The timing diagrams shown in FIGS. 5A-5H show examples of messages with and without invalidation. In FIG. 5A an invalidation signal is injected onto the bus (no other bus activity). The upper signal is the bus voltage measured differentially. FIG. 5B illustrates BC-to-RT Message, normal communication without invalidation. The upper signal is the bus voltage measured differentially. FIG. 5C illustrates BC-to-RT Message, Invalidation occurring after receiving command word. First data word is invalidated. The upper signal is the bus voltage measured differentially, and the bottom signal is the time window in which the invalidation signal is injected. FIG. 5D illustrates BC-to-RT Message, Command word itself is invalidated by the disclosed device and methods after receiving command sync and first five bits of RT address. The upper signal is the bus voltage measured differentially, and the bottom signal is the time window in which the invalidation signal is injected. FIG. 5E illustrates RT-to-BC Message, normal communication without invalidation. The upper signal is the bus voltage measured differentially. FIG. 5F illustrates BC-to-RT Message, invalidation occurring after receiving command word. First data word is invalidated. The upper signal is the bus voltage measured differentially, and the bottom signal is the time window in which the invalidation signal is injected. FIG. 5G illustrates RT-to-BC Message, command word itself is invalidated by the disclosed devices and methods after receiving command sync and first five bits of RT address. The upper signal is the bus voltage measured differentially, and the bottom signal is the time window in which the invalidation signal is injected.

The demonstration shows that the disclosed implementations are flexible and can be integrated with almost any security policy algorithm or security policy layer. Security rules can be programmed in multiple ways, including hard-coded in HDL (used in the initial demonstration); loaded into FPGA lookup table from non-volatile memory (e.g. on existing Abaco platforms); loaded into FPGA lookup table from a secure microcontroller; other more complex methods are possible as well, since the disclosed implementations design provides all pertinent message information to the security policy layer; the disclosed security mechanisms can integrate with third party security algorithms; security rules/policy can be created from simple analysis of known traffic or can be created using bus monitoring and machine-learning techniques. Further it is shown that the disclosed implementations do not interfere at all with normal bus traffic, but remains entirely passive. The security mechanism can be integrated with third party non-Abaco terminals. The security device can be implemented as a standalone device to help secure an otherwise unsecured bus. Further, the security device can be integrated with a bus controller to prevent all other terminals from initiating messages. In some instances, the security device can give an indication of the presence of abnormal activity or threats that have been detected. This notification can be tailored to the needs of the system or platform.

CONCLUSION

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby fully incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A bus security device integrated into a bus controller (BC) that provides security on a MIL-STD-1553 serial data bus, said device comprising:

a memory, wherein the memory at least contains security rules stored thereon;

a processing circuit in communication with the memory; and a transceiver that connects the bus security device to the MIL-STD-1553 serial data bus, wherein the processing circuit is programmed to:

monitor the MIL-STD-1553 serial data bus in accordance with the security rules stored in the memory; and if the processing circuit detects an anomaly on the MIL-STD-1553 serial data bus that is characterized as a threat by the rules stored in the memory, then the processing circuit causes the transceiver to inject an invalidation signal onto the MIL-STD-1553 serial data bus to counteract the anomaly, wherein the anomaly comprises a message on the MIL-STD-1553 serial data bus that is characterized as the threat and the invalidation signal comprises a relatively short transmission burst injected onto the MIL-STD-1553 serial data bus that creates a collision with either a data or a status word transmission and causes the message characterized as the threat to be invalidated, wherein the anomaly comprising a message on the MIL-STD-1553 serial data bus that is characterized as the threat comprises a broadcast mode command without data, a non-allowed command word, or an out-of-bounds data word, and wherein the message characterized as the threat is invalidated by the invalidation signal corrupting its Manchester encoding or sync encoding, and wherein the invalidation of broadcast mode commands without data begins before the bus security device receives all of the broadcast mode command, and wherein the BC is a secure BC and the bus security device detects a command word transmission in the MIL-STD-1553 serial data bus or in a stub of the MIL-STD-1553 serial data bus that connects the BC to the MIL-STD-1553 serial data bus and determines whether the command word transmission was initiated by the BC or not by the BC.

2. The device of claim 1, wherein the invalidation signal is at a higher frequency than normal traffic on the MIL-STD-1553 serial data bus.

3. The device of claim 1, wherein the BC is an unsecure BC and the bus security device provides security against false BC attacks caused by a second false BC generating traffic on the MIL-STD-1553 serial data bus.

4. The device of claim 1, wherein the BC is an unsecure BC and the device further comprises a transmit detect device to detect a transmission in a stub of the MIL-STD-1553 serial data bus that connects the BC to the MIL-STD-1553 serial data bus.

5. The device of claim 1, wherein the bus security device detects BC command transmission by both monitoring the MIL-STD-1553 serial data bus and by detecting current in the stub of the MIL-STD-1553 serial data bus.

6. The device of claim 1, wherein any detected transmission determined to not be initiated by the BC is invalidated by the bus security device.

7. The device of claim 1, wherein the BC is an unsecure BC and comprises a fixed silicon BC protocol sequencer and/or a BC that cannot be modified.

8. The device of claim 1, wherein the device determines whether the command word transmission was initiated by the BC either by direct integration with a BC sequencer in the processing circuit, or by detection of a command word transmission by detecting current in the stub of the MIL-STD-1553 serial data bus.

9. The device of claim 1, wherein if the bus security device determines the command word transmission was not initiated by the BC, then it determines that the command word transmission was initiated by a false BC and the device invalidates the command word transmission initiated by the false BC.

10. A method of providing security on a MIL-STD-1553 serial data bus, said method comprising:

monitoring the MIL-STD-1553 serial data bus in accordance with security rules; and in response to detecting an anomaly on the MIL-STD-1553 serial data bus that is characterized as a threat by the security rules, then the injecting an invalidation signal onto the MIL-STD-1553 serial data bus to counteract the anomaly, wherein the anomaly comprises a message on the MIL-STD-1553 serial data bus that is characterized as the threat and the invalidation signal comprises a relatively short transmission burst injected onto the MIL-STD-1553 serial data bus that creates a collision with either a data or a status word transmission and causes the message characterized as the threat to be invalidated, wherein the anomaly comprising a message on the MIL-STD-1553 serial data bus that is characterized as the threat comprises a broadcast mode command without data, a non-allowed command word, or an out-of-bounds data word, and wherein the message characterized as the threat is invalidated by the invalidation signal corrupting its Manchester encoding or sync encoding, and wherein the invalidation of the broadcast mode commands without data begins before all of the broadcast mode command is received, and wherein the BC is a secure BC and the bus security device detects a command word transmission in the MIL-STD-1553 serial data bus or in a stub of the MIL-STD-1553 serial data bus that connects the BC to the MIL-STD-1553 serial data bus and determines whether the command word transmission was initiated by the BC or not by the BC.

11. The method of claim 10, wherein the invalidation signal is at a higher frequency than normal traffic on the MIL-STD-1553 serial data bus.

12. The method of claim 10, wherein the method is performed by a device that is integrated into a bus controller (BC).

13. The method of claim 10, wherein the BC is an unsecure BC and the device provides security against false BC attacks caused by a second false BC generating traffic on the MIL-STD-1553 serial data bus.

14. The method of claim 12, wherein the BC is an unsecure BC and the device further comprises a transmit detect device to detect a transmission in a stub of the MIL-STD-1553 serial data bus that connects the BC to the MIL-STD-1553 serial data bus.

15. The method of claim 14, wherein the device detects BC command transmission by both monitoring the MIL-STD-1553 serial data bus and by detecting current in the stub of the MIL-STD-1553 serial data bus.

16. The method of claim 15, wherein any detected transmission determined to not be initiated by the BC is invalidated by the device.

17. The method of claim 12, wherein the BC is an unsecure BC and the BC comprises a fixed silicon BC protocol sequencer and/or a BC that cannot be modified.

18. The method of claim 10, wherein the device determines whether the command was initiated by the BC either by direct integration with a BC sequencer in a processing circuit of the device, or by detection of a command word transmission by detecting current in the stub of the MIL-STD-1553 serial data bus.

19. The method of claim 10, wherein if the device determines the command word transmission was not initiated by the BC, then it determines that the command word transmission was initiated by a false BC and the device invalidates the command word transmission initiated by the false BC.

* * * * *